United States Patent [19]

Hagikura et al.

[11] Patent Number: 4,878,001
[45] Date of Patent: Oct. 31, 1989

[54] DRIVE CONTROL DEVICE FOR MOTOR ACTUATOR IN AUTOMOBILE AIR CONDITIONER

[75] Inventors: Hirofumi Hagikura; Haruki Kawamoto, both of Tokyo, Japan

[73] Assignee: Nihon Radiator Co., Ltd., Tokyo, Japan

[21] Appl. No.: 174,178

[22] Filed: Mar. 28, 1988

[30] Foreign Application Priority Data

Mar. 30, 1987 [JP] Japan ................. 62-74224

[51] Int. Cl.⁴ ............................... B60H 3/00
[52] U.S. Cl. ........................ 318/446; 318/468; 165/42
[58] Field of Search ........... 318/466, 468, 470, 446; 307/10 R; 200/37 R, 50 C; 165/16, 41, 42; 98/2.06, 2.07, 2.08, 2.11, 2.12

[56] References Cited

U.S. PATENT DOCUMENTS 4,355,752 10/1982 Antoine ..................... 98/2.06 X
4,517,422 5/1985 Black, III et al. ............ 200/50 C
4,702,307 10/1987 Ito et al. ..................... 165/42 R

FOREIGN PATENT DOCUMENTS 60-645 1/1985 Japan.

Primary Examiner—Bentsu Ro
Attorney, Agent, or Firm—Gordon W. Hueschen

[57] ABSTRACT

The present invention relates to a drive control device for a motor actuator for use with an automobile air conditioner.

The drive control device for a motor actuator is formed by using a transistor, and the supply of current from a power source to a motor constituting the drive unit of the motor actuator is carried out by the switching operation of a single transistor.

A safety circuit is added to the control switches for applying a signal to the control device for the motor actuator, the safety circuit operates to always make the air condition in the compartment to be set required air conditioning mode.

2 Claims, 6 Drawing Sheets

DRIVE CONTROL DEVICE FOR MOTOR ACTUATOR IN AUTOMOBILE AIR CONDITIONER

BACKGROUND OF THE INVENTION

1. Field of the Invention

The present invention relates to an improvement in a drive control device for a motor actuator for use with an automobile air conditioner, for example.

2. Description of the Prior Art

In recent years, the automobile air conditioner is automatically controlled, and in association therewith, it is known that an intake door, mix door and various outlet doors installed in the automobile air conditioner are driven by motor actuator.

Generally, the motor actuator is controlled by an exclusive drive control device, and such a conventional drive control device for the motor actuator is disclosed in Japanese Utility Model Publication No. 60-645, which device employs relays.

Figure 6:
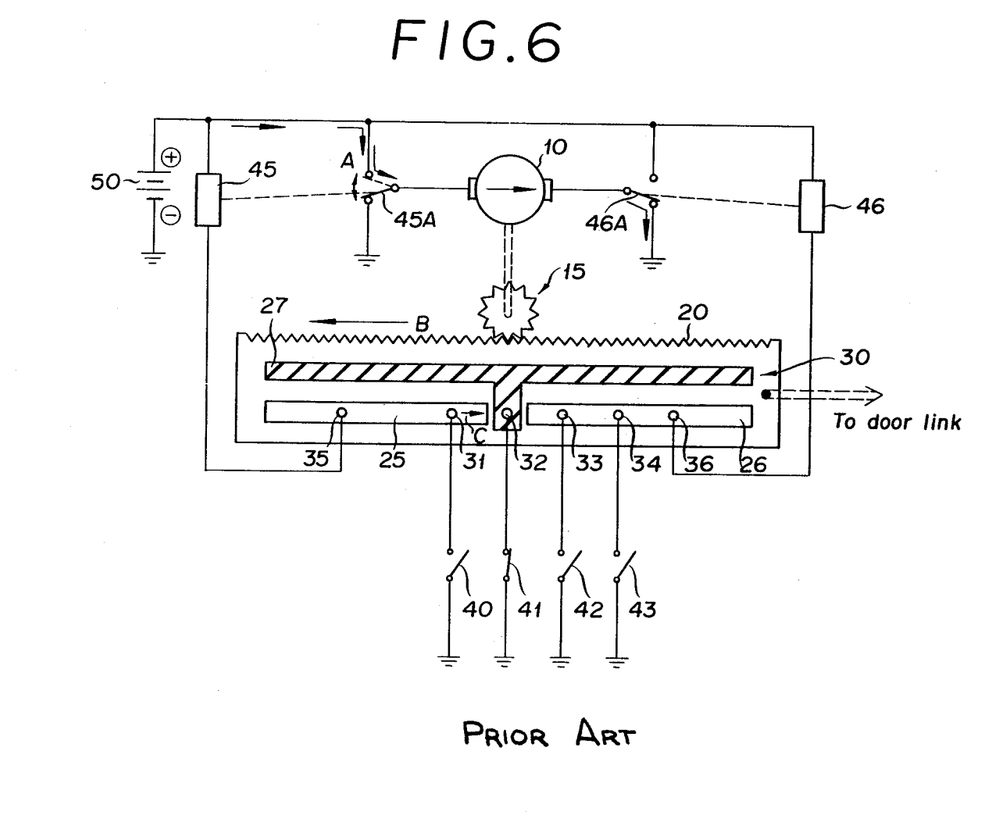
FIG. 6 is a detailed circuit diagram of the drive control device for the motor actuator in the prior art.

The conventional drive control device for the motor actuator is shown in FIG. 6. Referring to FIG. 6, the drive control device is generally composed of a drive unit for driving the doors and a control unit for controlling the operation of the drive unit.

The drive unit is constituted of a motor 10 functioning as a drive source for driving the doors and a moving member 20 for transmitting a torque of the motor 10 through a gear mechanism 15, converting the torque to a reciprocating motion, and driving the doors mechanically connected to the moving member 20. On the other hand, the control unit is constituted of an electrode pattern 30 including a first strip electrode 25, a second strip electrode 26 and a non-conductive portion 27 which are formed on the surface of the moving member 20, control switches 40 to 43 connected at respective one ends with sliding contacts 31 to 34 slidingly contacting with the electrode pattern 30 and grounded at respective other ends, and relays 45 and 46 connected at respective one ends with sliding contacts 35 and 36 slidingly contacting with the electrode pattern 30 and connected at respective other ends with a power source 50, and contacts 45A and 46A adapted to be operated according to the operation of the relays 45 and 46 and supply current to the motor 10. The first strip electrode 25 and the second strip electrode 26 are formed of a metal plate primarily containing copper, while the sliding contacts 31 to 36 are formed by a conductive brush primarily containing carbon. Thus, there is provided a switch of a type such that the movement of the moving member 20 causes the sliding motion between the metal plate and the brush.

Accordingly, when any of the control switches 40 to 43 is turned on, the moving member 20 is moved to a predetermined position, thereby driving an intake door, mix door and various air outlet doors installed in the automobile air conditioner through a door link (not shown) and adjusting an air conditioning mode and the like of the air conditioner.

For example, when the control switch 40 is turned on under the condition shown in FIG. 6, the control switch 41 is turned off in association therewith. As a result, there is formed a closed circuit for a control system allowing the current to flow from the positive terminal of the power source 50 through the relay 45, the sliding contact 35, the first strip electrode 25, the sliding contact 31, the control switch 40 to the negative terminal of the power source 50. Accordingly, the relay 45 is operated to move the contact 45A in a direction depicted by arrow in FIG. 6 and thereby close the same. Accordingly, the current flows from the positive terminal of the power source 50 to the motor 10 in a direction depicted by arrow in FIG. 6, and the motor 10 is rotated in a direction corresponding to this current direction. The rotation of the motor 10 causes the movement of the moving member 20 through the gear mechanism 15 in a direction depicted by arrow B in FIG. 6, and simultaneously causes a relative movement of the sliding contact 31 in a direction depicted by arrow C. The movement of the moving member 20 causes the door link mechanically connected thereto to be driven to rotate the intake door, the mix door and the various air outlet doors. When the sliding contact 31 reaches the non-conductive portion 27 during the movement of the moving member 20, the closed circuit of the control system is opened to thereby make the relay 45 inoperative and open the contact 45 A.

As a result, the motor 10 is stopped to thereby set a desired air conditioning mode and the like of the automobile air conditioner.

However, in the above-mentioned drive control device for the motor actuator, since the control unit includes the relays, it is advantageous in such that a voltage drop in the circuit from the power source 50 to the motor 10 is less, but there is a shortcoming that the control unit has a less resistance against vibration since the relay is a mechanical component. This shortcoming is of a great significance from a viewpoint of reliability of the drive control device for the motor actuator in an automobile to which various vibrations are applied in running.

The conventional drive control device for the motor actuator has another shortcoming such that it is limited to make the relay compact since it is a mechanical component, and that a plurality of brushes functioning as the sliding contacts are used. That is, the production of a compact motor actuator to be installed in a limited space of an automobile is dependent upon the use of a compact relay and the number of brush. Therefore, it is very difficult to make compact the motor actuator using the relay, causing a problem such that a production cost of the motor actuator cannot be reduced down to a certain value.

SUMMARY OF THE INVENTION

It is an object of the present invention to provide a drive control device for a motor actuator which solves the above-mentioned problems in the prior art, that is, which is relatively easily made compact and is inexpensive with a high reliability.

According to the present invention, the main circuit of the control unit of the motor actuator is formed by using a transistor as a semiconductor, and the supply of current from a power source to a motor constituting the drive unit of the motor actuator is carried out by the switching operation of a single transistor, so that a voltage drop in a circuit from the power source to the motor may be made very small. Accordingly, the efficiency of the motor is improved. That is, if the rating of the motor is identical, a driving torque of the motor can be increased by an amount corresponding to the decrease in voltage drop. In other words, if the driving torque of the motor is identical, a compact motor actuator for driving the motor can be employed.

Furthermore, according to the present invention, it is sufficient to provide a single brush to be slidingly contacted with the moving member adapted to be moved in association with the rotating of the motor for rotating the intake door, the mix door and the various air outlet doors through the door link. With this arrangement, the motor actuator may be made compact, and the maintenance may be improved with a less number of parts. In addition, the reliability, may be improved, and the production cost may be reduced.

Further, according to the present invention, a safety circuit is added to the control switches for applying a signal to the control device for the motor actuator. Accordingly, even if one of the control switches fails to operate to cause a problem that an air condition to be required by a passenger is not obtained, the safety circuit operates to always make the air condition in the compartment to be set to a defrost mode, for example. Thusly, at least an air condition required in safety driving is designed to be set. Accordingly, the reliability or the safety in the automobile air conditioner may be improved.

In accordance with the present invention there is provided a drive control device for a motor actuator in an automobile air conditioner for controlling opening and closing operations of doors to be installed in said automobile air conditioner, said drive control device comprising: a series of plural switches connected in series to each other, wherein when one of said switches for setting an opening degree of one of said doors is opened, all of the other switches for setting the other opening degree of the other doors are closed; a first sliding member provided with a plurality of separate contacts located in separation from each other, each of said separate contacts being connected to a terminal of said each switch, and provided with a main contact connected to one of terminals of a power source; a second sliding member adapted to be moved relative to said first sliding member and contact with said main contact and any of said separate contacts; a motor for driving said doors to open and close the same and moving either of said first sliding member or said second sliding member; a first transistor adapted to be connected to one of input terminals of said motor and any one of said separate contacts provided on said first sliding member, said first transistor being connected to the other terminal of said power source; a second transistor adapted to be connected to the other input terminal of said motor and any one of said separate contacts provided on said first sliding member, said second transistor being connected to the other terminal of said power source; and first and second switching circuits for switching said fist transistor and said second transistor, respectively, wherein said motor is driven by said first and second switching circuits from a timing when any one of said switches is opened to a timing when said second sliding member comes into contact with both the main contact and the adjacent separate contacts contacted both the terminals of said switch opened, and when said second sliding member comes into the main contact and the adjacent separate contacts, said first and second transistors are made off by said first and second switching circuits.

Further, in accordance with the present invention there is provided a drive control device for a motor actuator in an automobile air conditioner for controlling opening and closing operations of doors to be installed in said automobile air conditioner, said drive control device comprising: a series of plural switches connected in series to each other, wherein when one of said switches for setting an opening degree of one of said doors is opened, all of the other switches for setting the other opening degree of the other doors are closed; an auxiliary switch connected to said switches located at both ends of said series of switches, wherein when a specific one of said switches for setting the opening degree of said one of said doors is opened, said auxiliary switch is closed cooperatively; a first sliding member provided with a plurality of separate contacts located in separation from each other, each of said separate contacts being connected to a terminal of said each switch, and provided with a main contact connected to one of terminals of a power source; a second sliding member adapted to be moved relative to said first sliding member and contact with said main contact and any of said separate contacts; a motor for driving said doors to open and close the same and moving either of said first sliding member or said second sliding member; a first transistor adapted to be connected to one of input terminals of said motor and any one of said separate contacts provided on said first sliding member, said first transistor being connected to the other terminal of said power source; a second transistor adapted to be connected to the other input terminal of said motor and any one of said separate contacts provided on said first sliding member, said second transistor being connected to the other terminal of said power source; and first and second switching circuits for switching said first transistor and said second, transistor, respectively, wherein said motor is controlled by said first and second switching circuits from a timing when an one of said switches is opened to a timing when said second sliding member comes into contact with both the main contact and the adjacent separate contacts connected to both the terminals of said switch opened, and when said second sliding member comes into the main contact and the adjacent separate contacts, said first and second transistors are made off by said first and second switching circuits.

DETAILED DESCRIPTION OF THE INVENTION

Figure 1:
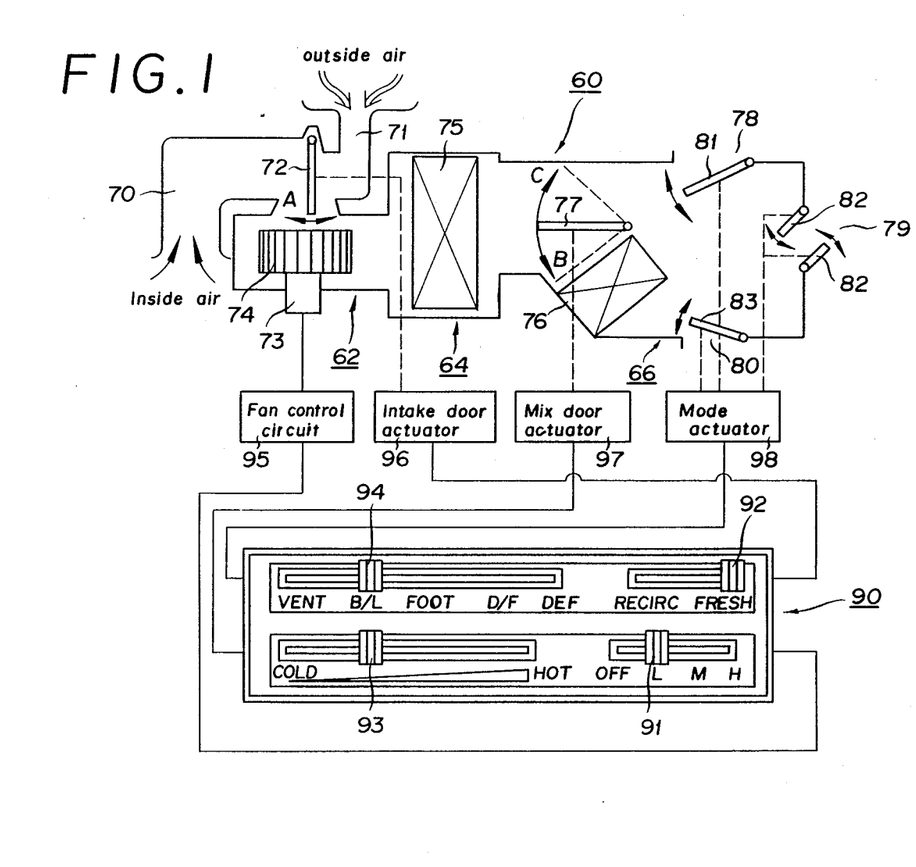
FIG. 1 is a schematic illustration of a mechanism for driving various doors installed in the automobile air conditioner provided with the drive control device for the motor actuator according to the present invention.

FIG. 1 is a schematic illustration of an automobile air conditioner provided with a drive control device for a motor actuator according to the present invention.

Reference numeral 60 designates generally to an air conditioner body for inducing the air inside a compartment or outside thereof, adjusting the temperature of the air to a temperature required by a passenger, and blowing the temperature adjusted air to the compartment. The air conditioner body 60 is constituted of an intake unit 62 for inducing the air inside the compartment or outside thereof, a cooler unit 64 for cooling the air induced, and a heater unit 66 for heating the air cooled by the cooler unit 64 and blowing the air having a temperature required by the passenger in to the compartment. These units 62, 64 and 66 are connected together in series under an airtight condition as shown.

The intake unit 62 is provided with an inside air intake 70 for inducing the air inside the compartment and an outside air intake 71 for inducing the air outside the compartment. There is provided at a joining portion between both the air intakes 70 and 71 an intake door 72 adapted to open and close air inlets of the air intakes 70 and 71. The intake door 72 is operated to selected the inside air or the outside air to be introduced into the compartment or decide an in intake rate of the inside air or the outside air. There is provided downstream of the intake door 72, a fan 74 adapted to be driven by a fan motor 73. The rotation of the fan 74 causes intake of the inside or outside air selected by the intake door 72.

The cooler unit 64 is provided with an evaporator 75 for cooling the air induced by the fan 74 by heat exchange with a refrigerant t be supplied by a compressor (not shown). When the air induced by the fan 74 passes through the evaporator 75, it is cooled and dehumidified.

The heater unit 66 is provided with a heater core 76 for heating the air having passed through the evaporator 75 and cooled thereby by heat exchange with a cooling water of an engine (not shown) which water flows in the heater core 76. There is provided upstream of the heater core 76 a rotatable mix door 77 for deciding a proportion between the air passing through the heater core 76 and the air bypassing the heater core 76 according to its rotative position and thereby adjusting the temperature of the air to be blown into the compartment. Further, there are provided downstream of the heater core 76 and the mix door 77 a defrost outlet 78 for blowing the air adjusted in temperature toward an inner surface of a windshield, a vent outlet 79 for blowing the air adjusted in temperature from a ventilator provided at a central position of an instrument panel into the compartment, and a foot outlet 80 for blowing the air adjusted in temperature toward a passenger's feet. The defrost outlet 78, the vent outlet 79 and the foot outlet 80 are provided with a defrost door 81, a vent door 82 and a foot door 83, respectively. According to the open or closed position of these doors 81, 82 and 83, the air adjusted in temperature is blown from a desired position in the compartment.

Reference numeral 90 designates generally to a controller provided in the compartment for outputting to the air conditioner various signals relating to air conditioning. The controller 90 is provided with a fan control lever 91 for outputting a control signal of rotating speed of the fan 74, an inside/outside air selector lever 92 for outputting a signal relating to an opening angle or a setting position of the intake door 72, a temperature control lever 93 for outputting an adjusting signal of an opening angle of the mix door 77, and a mode lever 94 for outputting an air conditioning mode setting signal. The fan control lever 91 has four positions of stop (OFF), low speed (L), medium speed (M) and high speed (H). A fan control circuit 95 is connected to a contact (not shown) to be opened and closed by the fan control lever 91, and the fan control circuit 95 operates to rotate the fan motor 73 at a predetermined speed according to a position selected by the fan control lever 91. For example, when the fan control lever 91 is set to the position of low speed (L), a set signal is input to the fan control circuit 95, which is turn operates to rotate the fan motor 73 at a low speed and thereby rotate the fan 74 at a low speed. The inside/outside air selector lever 92 is connected to an intake door actuator 96, which operates to rotate the intake door 72 according to the operation of the inside/outside air selector lever 92 is set to the position of FRESH, a set signal is input to the intake door actuator 96, which in turn operates to rotate the intake door in a direction depicted by arrow A in FIG. 1. As a result, the inside air intake is closed, and the outside air intake is opened to induce the outside air into the compartment. Further, the temperature control lever 93 is connected to a mix door actuator 97, which receives a setting position signal from the temperature control lever 93 and determines an opening angle of the mix door 77 according to the setting position signal. For example, when the temperature control lever 93 is moved toward the position of COLD, the mix door 77 is rotated in a direction depicted by arrow B in FIG. 1, that is, in a such direction as to decrease a quantity of air passing through the heater core 76, so that a cold air is blown into the compartment. In contrast, when the temperature control lever 93 is moved toward the position of HOT, the mix door 77 is rotated in a direction depicted by arrow C in FIG. 1, so that a hot air is blown into the compartment. The mode lever 94 is provided with five setting positions, namely, a VENT mode for blowing the air from the vent outlet 79, a B/L (bilevel) mode for blowing a relatively cold air from the vent outlet 79 and also blowing a relative warm air from the foot outlet 80, a D/F (defrost/foor) mode for blowing the air from both the defrost outlet 78 and the foot outlet 80, and DEF mode for blowing the air from the defrost outlet 78 only. The mode lever 94 is connected to a mode actuator 98, which operates to rotate the defrost door 81, the vent door 82 and the foot door 83 according to the setting position of the mode lever 94, thereby setting an air conditioning mode required by the passenger.

When the mode lever 94 is set to the VENT mode, a set signal of this mode is input to the mode actuator 98, which in turn operates to rotate the defrost door 81 and the foot door 83 in a such direction as to close the outlets 78 and 80, respectively, and simultaneously rotate the vent door 82 is such a direction as to open the vent outlet 79, thus blowing the air adjusted in temperature from the vent outlet 79, thus blowing the air adjusted in temperature from the vent outlet 79. When the mode lever 94 is set to the B/L mode, the mix door actuator 97 operates to rotate the mix door 77 to a substantially intermediate opening angle position, and the mode actuator 98 operates to rotate the defrost door 81 in such a direction as to close the outlet 78 and also rotate the vent door 82 and the foot door 83 in such a direction as to open the vent outlet 79 and the foot outlet 80, respectively, thereby blowing a electively cool air from the vent outlet 79 into the compartment and blowing a relatively warm air from the foot outlet 80 into the compartment, thus obtaining an air condition where the head is kept cool and the feet is kept warm. When the mode lever 94 is set to the FOOT mode, the mode actuator 98 operates to rotate the defrost door 81 and the vent door 82 in such a direction as to close the defrost outlet 78 and the vent outlet 79, respectively, and rotate the foot door 83 in such a direction as to open the foot outlet 80, thereby blowing the temperature adjusted air from the foot outlet 80. When the mode actuator 94 is set to the D/F mode, the mode actuator 98 operates to rotate the defrost door 81 at a predetermined angle and thereby open the defrost outlet 78 by a small amount, and also rotate the foot door 83 in such a direction as to open the foot outlet 80, while rotating the vent door 82 in such a direction as to close the vent outlet 79, thereby blowing the temperature adjusted air from the defrost outlet 78 and the foot outlet 80. Finally, when the mode lever 94 is set to the DEF mode, the mode actuator 98 operates to rotate the foot door 83 and the vent door 82 in such a direction as to close the foot outlet 80 and the vent outlet 79, and also rotate the defrost door 81 in such a direction as to open the defrost outlet 78, thereby blowing the temperature adjusted air form the defrost outlet 78 toward the inner surface of the windshield of the vehicle to thereby prevent a frost in the inner surface of the windshield.

Figure 2:
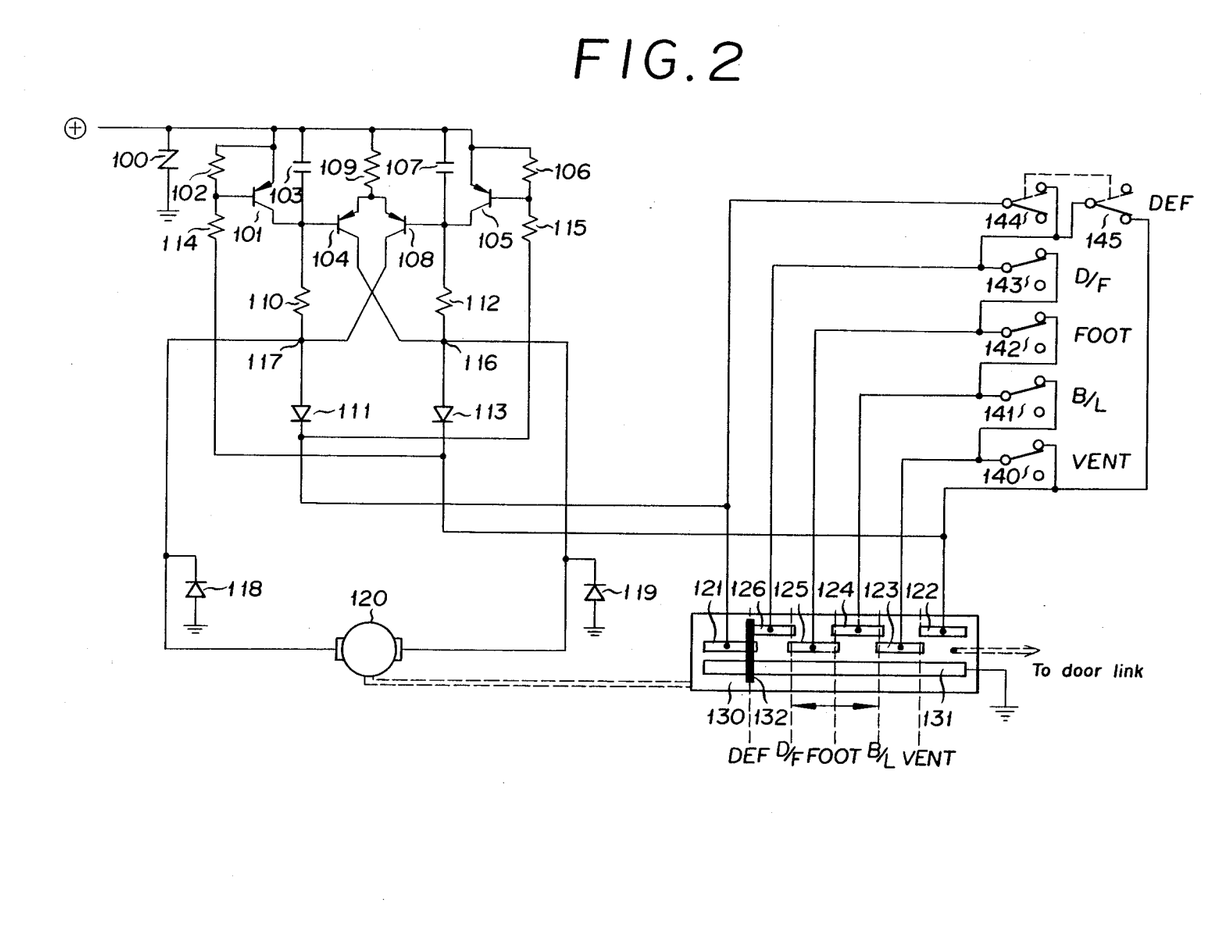
FIG. 2 is a detailed circuit diagram of the drive control device of the motor actuator according to the present invention.

FIG. 2 is a circuit diagram of the drive control device for the motor actuator according to the present invention. The motor actuator is applicable to all of the intake door actuator 96, the mix door actuator 97 and the mode actuator 98 shown in FIG. 1. In the following description of the preferred embodiment, the drive control device of the motor actuator is exemplarily applied to the mode actuator 98.

As shown in FIG. 2, the drive control device for the motor actuator includes a primary control circuit having transistors. A protection element 100 for protecting this circuit from a surge voltage is grounded at one end, and is connected at the other end with a positive terminal of a power source. An emitter of a transistor 101 is connected to the positive terminal of the power source, and a resistor 102 is connected between the emitter of the transistor 101 and a base thereof. A collector of the transistor 101 is connected to a capacitor 103 connected to the positive terminal of the power source, and also is connected to a base of a transistor 104. Similarly, an emitter of a transistor 105 is connected to the positive terminal of the power source, and a resistor 106 is connected between the emitter of the transistor 105 and a base thereof. A collector of the transistor 105 is connected to a capacitor 107 connected to the positive terminal of the power source, and is also connected to a base of as transistor 108. Each emitter of the transistor 104 and the transistor 108 is connected through a resistor 109 to the positive terminal of the power source. A base of the transistor 104 is connected through a resistor 110 to a diode 11, and a base of the transistor 108 is connected through a resistor 112 to a diode 113. The diode 113 is connected to a resistor 114 connected to the base of the transistor 101, and the diode 111 is connected to a resistor 115 connected to the base of the transistor 105. Accordingly, when current flows in the resistor 114, the transistor 101 goes on, and when current flows in the resistor 115, the transistor 105 goes on.

Further, when the transistor 101 goes on, and current flows in the resistor 110, a base potential of the transistor 104 rises to make the transistor 104 go off. When the transistor 105 goes on, and current flows in the resistor 112, a base potential of the transistor 108 rises to make the transistor 108 go off.

The collector of the transistor 104 is connected to a junction 116 between the resistor 112 and the diode 113, and is also connected to one terminal of a motor 120 constituting the motor actuator. The collector of the transistor 108 is connected to a junction 117 between the resistor 110 and the diode 111, and is also connected to the other terminal of the motor 120. Each terminal of the motor 120 is connected to a diode 118 or a diode 119 for the protection from a surge voltage. When the motor 120 is rotate, a moving member 130 functioning as a first sliding member mechanically connected to a door link is reciprocated in directions depicted by arrows in FIG. 2.

The diode 111 is connected to a conductive separate contact 121 formed on the moving member 130, and the diode 113 is connected to a conductive separate contact 122 formed on the moving member 130.

A series of switches shown on the right side in FIG. 2 are switches adapted to be operated by the mode lever 94 of the controller 90 shown in FIG. 1. A vent switch 140 adapted to be opened when setting the mode lever 94 to the VENT mode is connected to a separate contact 122 and a separate contact 123, and is also connected to a bilevel switch 141 adapted to be opened when setting the mode lever 94 to the B/L mode. The bilevel switch 141 is connected to the separate contact 123 and a separate contact 124, and is also connected to a foot switch 142 adapted to be opened when setting the mode lever 94 to the FOOT mode. The foot switch 142 is connected to a separate contact 124 and a separate contact 125, and is also connected to a defrost/foot switch 143 adapted to be opened when setting the mode lever 94 to the D/F mode. The defrost/foot switch 143 is connected to the separate contact 125 and a separate contact 126, and is also connected to a defrost switch 144 and a safety switch 145 which defrost switch 144 is adapted to be opened when setting the mode lever 94 to the DEF mode. The defrost switch 144 is connected to the separate contact 126 and the separate contact 121, and the safety switch 145 is connected to the vent switch 140 and the defrost switch 144. The defrost switch 144 and the safety switch 145 constitute an interlocking switch adapted to conduct simultaneous and counter operation. That is, the interlocking switch operates in such a manner that when the defrost switch 144 is closed, the safety switch 145 is opened cooperatively, and when the defrost switch 144 is opened, the safety switch 145 is closed cooperatively.

The separate contacts 121 to 126 are provided on the moving member 130 regularly in predetermined positions in such a manner that the adjacent separate contacts overlap with respect to the moving direction of the moving member 130. A conductive main contact 131 grounded at its one end is arranged on the moving member 130 along the separate contacts 121 to 126. A fixed brush 132 functioning as a second sliding member is provided to electrically connect the separate contacts 121 to 126 with the main contact 131 in such a manner that these contacts are adapted to slidingly contact the brush. The slide contact position of the brush 132 varies with the moving position of the moving member 130. For example, when the air conditioning mode is set in the vent mode, the brush 132 is in such a position as to contact both the separate contacts 122 and 123. In the bilevel mode, the brush 132 is in such a position as to contact both the separate contacts 123 and 124. In the foot mode, the brush 132 is in such a position as to contact both the separate contacts 124 and 125. In the defrost/foot mode, the brush 132 is in such a position as to contact both the separate contacts 125 and 126. In the defrost mode, the brush 132 is in such a position as to contact both the separate contacts 126 and 121.

There will now be described the operation of the drive control device for the motor actuator according to the present invention as mentioned above.

Figure 3:
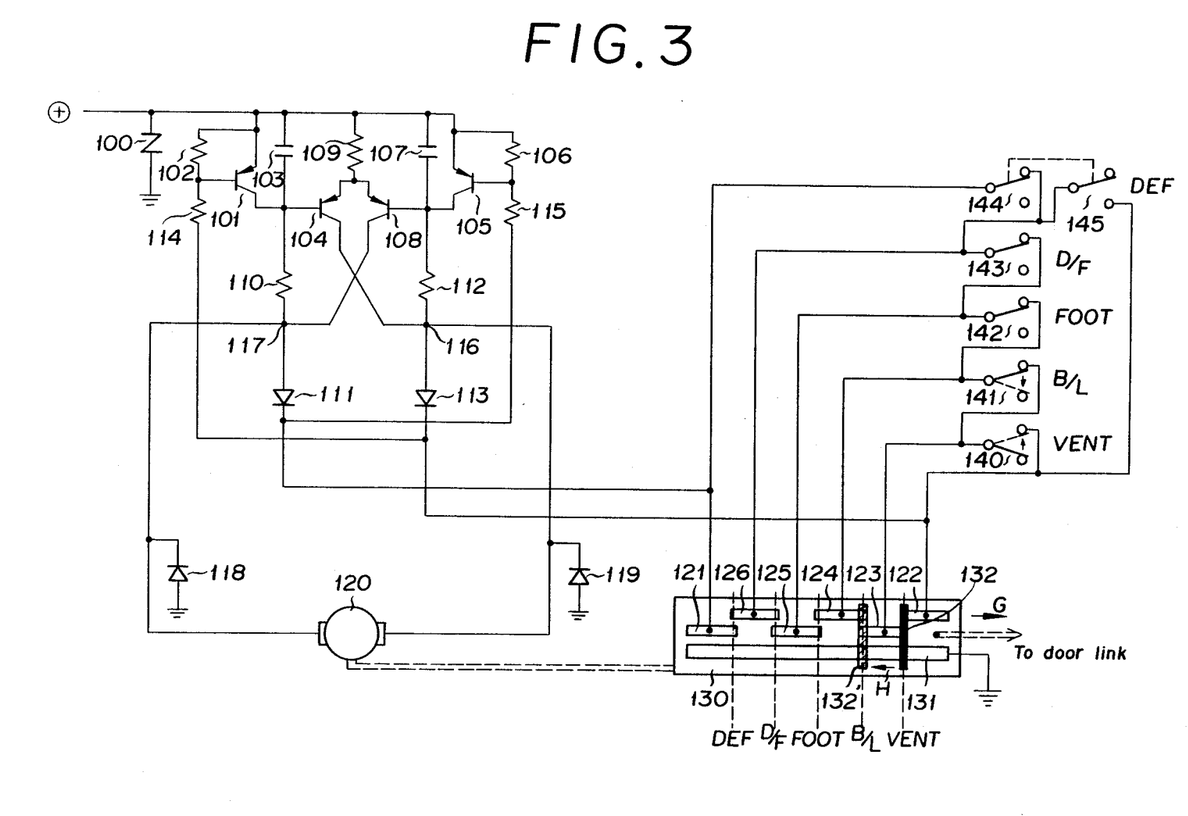
FIG. 3 is a circuit diagram showing the operation drive control device for the motor actuator according to the present invention, in the case that the air conditioning mode is changed from a VENT mode to a B/L mode.

FIG. 3 shows an operating condition of the drive control device for the motor actuator in the case that the air conditioning mode is changed from the vent mode to the bilevel mode.

At first, the air conditioning mode is set in the vent mode in this case. Therefore, the vent door 82 only is in an open position, and the defrost door 81 and the foot door 83 are in a closed position. Accordingly, the temperature adjusted air is being blown from the vent outlet 79 into the compartment.

In this case, the brush 132 provided in the mode actuator 98 is in such a position as to contact both the separate contacts 122 and 123 as shown in FIG. 3. Further, as the mode lever 94 is set in the VENT position, the vent switch 140 and the safety switch 145 are open, and the other switches are closed.

Under the condition, a first closed circuit for controlling the operation of the transistor 101 and a second closed circuit for controlling the operation of the transistor 105 are formed. The first closed circuit allows current to flow from the positive terminal of the power source through the resistor 102, the resistor 114, the separate contact 122, the brush 132 and the main contact 131 to the ground, while the second closed circuit allows current to flow from the positive terminal of the power source through the resistor 106, the resistor 115, the defrost switch 144, the defrost/foot switch 143, the foot switch 142, the bilevel switch 141, the separate contact 123, the brush 132 and the main contact 131 to the ground. Thus, the current flows in the resistor 114 and the resistor 115. Accordingly, both the transistor 101 and the transistor 105 are kept on to make a potential of the resistor 110 and the resistor 112 high. Accordingly, both the transistors 104 and 108 are kept off. As a result, no current flows in the motor 120, and the motor 120 remains stopped under the vent mode condition.

Next, when the mode lever 94 is operated by the passenger to set the B/L mode as shown in FIG. 1, the vent switch 140 is rotated in a direction depicted by the arrow in FIG. 3, and is therefore closed. Simultaneously, the bilevel switch 141 is rotated in a direction depicted by the arrow in FIG. 3, and is therefore opened. Accordingly, the second closed circuit is opened, and no current flows in the resistor 115 to cause the transistor 105 to go off. On the other hand, the first closed circuit remains closed, and the current flows in the resistor 114 to keep the transistor 101 on. Under the condition, the potential of the resistor 110 is high to keep the transistor 104 off, while the potential of the resistor 112 is low to make the transistor 107 go on. Thus, when the transistor 108 goes on, there is formed a drive circuit for the motor 120 allowing the current to flow from the positive terminal of the power source through the resistor 109, the transistor 108, the junction 117, the motor 120, the junction 116, the diode 113, the separate contact 122, the brush 132 and the main contact 131 to the ground. As a result, the motor 120 is rotated in a predetermined direction to move the moving member 130 in a direction depicted by arrow G in FIG. 3. Accordingly, the brush 132 is regarded to be moved relative to the moving member 130 in a direction depicted by arrow H in FIG. 3. Thus, the motor 120 continues to be rotated to move the brush 132, and when the brush 132 is moved away from the separate contact 122 to come into contact with the separate contact 123 only, there is formed a drive circuit for the motor 120 allowing the current to flow from the positive terminal of the power source through the resistor 109, the transistor 108, the junction 117, the motor 120, the junction 116, the diode 113, the vent switch 140, the separate contact 123, the brush 132 and the main contact 131 to the ground. As a result, the motor 120 is further rotated to move the moving member 130 in the direction of the arrow G. In association with this movement, when the brush 132 is brought into contact with both the separate contacts 123 and 124 as shown by a hatched brush 132' in FIG. 3, there is formed a first closed circuit allowing the current to flow from the positive terminal of the power source through the resistor 102, the resistor 114, the vent switch 140, the separate contact 123, the brush 132' and the main contact 131 to the ground, and there is also formed a second closed circuit allowing the current to flow from the positive terminal of the power source through the resistor 106, the resistor 115, the defrost switch 144, the defrost/foot switch 143, the foot switch 142, the separate contact 124, the brush 132' and the main contact 131 to the ground. Thus, the current flows in the resistors 114 and 115 to make the transistors 101 and 105 go on and make the potential of the resistors 110 and 112 high. As a result, both the transistors 104 and 108 go off. Accordingly, the drive circuit for the motor 120 is not formed, resulting in deenergization of the motor 120 and accordingly stopping the movement of the moving member 130. Thus, the air conditioning mode is set to the bilevel mode. In the bilevel mode, the defrost door 81 is rotated in such a direction as to close the defrost outlet 78, while the vent door 82 and the foot door 83 are rotated in such a direction as to open the vent outlet 79 and the foot outlet 80, respectively. As a result, a relatively cool air is blown from the vent outlet 79 into the compartment, and a relatively warm air is blown from the foot outlet 80 into the compartment, thus obtaining the air condition where the head is kept cool and the eh feet is kept warm.

Figure 4:
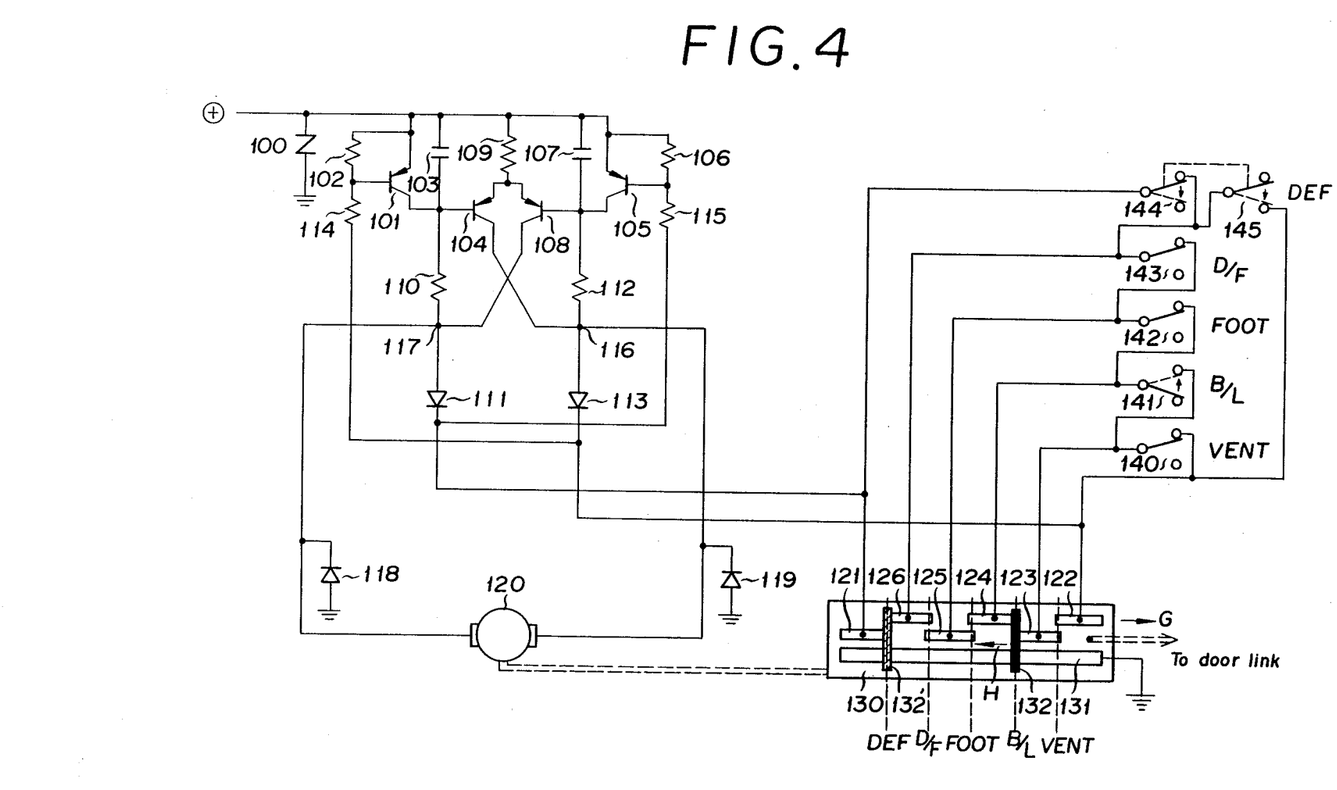
FIG. 4 is a circuit diagram showing the operation of the drive control device for the motor actuator according to the present invention, in the case that the air conditioning mode is changed from the B/L mode to a DEF mode.

FIG. 4 shows an operative condition of the drive control device for the motor actuator in the case that the air conditioning mode is changed from the bilevel mode to the defrost mode.

In the bilevel mode, each of the doors is set in the above-mentioned position. As shown in FIG. 4, the bilevel switch 141 and the safety switch 145 are in an open condition, and the other switches are in a closed condition. The first and second closed circuits as mentioned above remains effective to maintain the bilevel mode.

When the mode lever 94 is operated by the passenger so as to change the air conditioning mode from the B/L mode to the DEF mode, the bilevel switch 141 is rotated in a direction depicted by arrow in FIG. 4 to be closed. Simultaneously, the defrost switch 144 and the safety switch 145 are rotated in a direction depicted by arrows in FIG. 4 to make the defrost switch 144 be opened and make the safety switch 145 be closed. As the defrost switch 144 is thus opened, the second closed circuit as mentioned above for controlling the operation of the transistor 105 is opened. As a result, the transistor 108 goes on to form the drive circuit for the motor 120 allowing the current to flow from the positive terminal of the power source through the resistor 109, the transistor 108, the junction 117, the motor 120, the junction 116, the diode 113, the vent switch 140, the separate contact 123, the brush 132 and the main contact 131 to the ground. Accordingly, the motor 120 starts rotating in the predetermined direction to move the moving member 130 in the direction depicted by arrow G in FIG. 4, and accordingly move the brush 132 relatively in the direction depicted by arrow H in FIG. 4. Thus, the motor 120 continues to be rotated to move the brush 132 in slide contact with the separate contacts 124, 125 and 126 in this order. In association with the movement of the moving member 130, when the brush 132 is brought into contact with both separate contacts 126 and 121 as shown by a hatched brush 132', there is formed a first closed circuit allowing the current to flow from the positive terminal of the power source through the resistor 102, the resistor 114, the vent switch 140, the bilevel switch 141, the foot switch 142, the defrost/foot switch 143, the separate contact 126, the brush 132' and the main contact 131 to the ground, and there is also formed a second closed circuit allowing the current to flow from the positive terminal of the power source through the resistor 106, the resistor 115, the separate contact 121, the brush 132' and the main contact 131 to the ground. Accordingly, both the transistors 101 and 105 go on, and both the transistors 104 and 108 go off. As result, the drive circuit for the motor 120 is made open, and no current flows in the motor 120, thereby stopping the movement of the moving member 130 and setting the air conditioning mode to the defrost mode. In the defrost mode, the foot door 83 and the vent door 82 are rotated in such a direction as to close the foot outlet 78 and the vent outlet 79, respectively, while the defrost door 81 is rotated in such a direction as to open the defrost outlet 78 as shown in FIG. 1, thus blowing the temperature adjusted air from the defrost outlet 78 toward the inner surface of the windshield of the vehicle to thereby prevent the frost on the windshield.

If the safety switch 145 were not provided, there would generated a problem such that when the foot switch 142 has a contact fault, for example, in changing the air conditioning mode from the B/L mode to the DEF mode, the first closed contact is opened to cause the changing operation to stop at the foot mode, and as a result, the air conditioning mode required by the passenger is to obtained. That is, at the moment the brush 132 is over away from the separate contact 124, the first closed circuit allowing the current to flow from the positive terminal of the power source through the resistor 102, the resistor 114, the vent switch 140, the bilevel switch 141, the foot switch 142, the separate contact 125, the brush 132 and the main contact 131 to the ground is opened to cause the stoppage of the motor 120.

However, even when the foot switch 142 has a contact fault, the provision of the safety switch 145 maintains the first closed circuit closed. That is, at the moment the brush 132 is moved away from the separate contact 124, there is formed a circuit allowing the current to flow from the positive terminal of the power source through the resistor 102, the resistor 114, the safety switch 145, the defrost/foot switch 143, the separate contact 125, the brush 132 and the main contact 131 to the ground. Accordingly, the changing operation is not stopped at the foot mode, and the first closed circuit continues to be closed, thus ensuring the setting to the defrost mode.

As mentioned above, even if any one of the vent switch 140, the bilevel switch 141, the foot switch 142 and the defrost switch 143 is broken to cause an inoperable state, the defrost mode may be reliably obtained by operating the mode lever 94 to set to the DEF mode for the purpose of eliminating the frost on the inner surface of the windshield. Thus, the invention can provide an automobile air conditioner having a high reliability from the viewpoint of safety driving.

Figure 5:
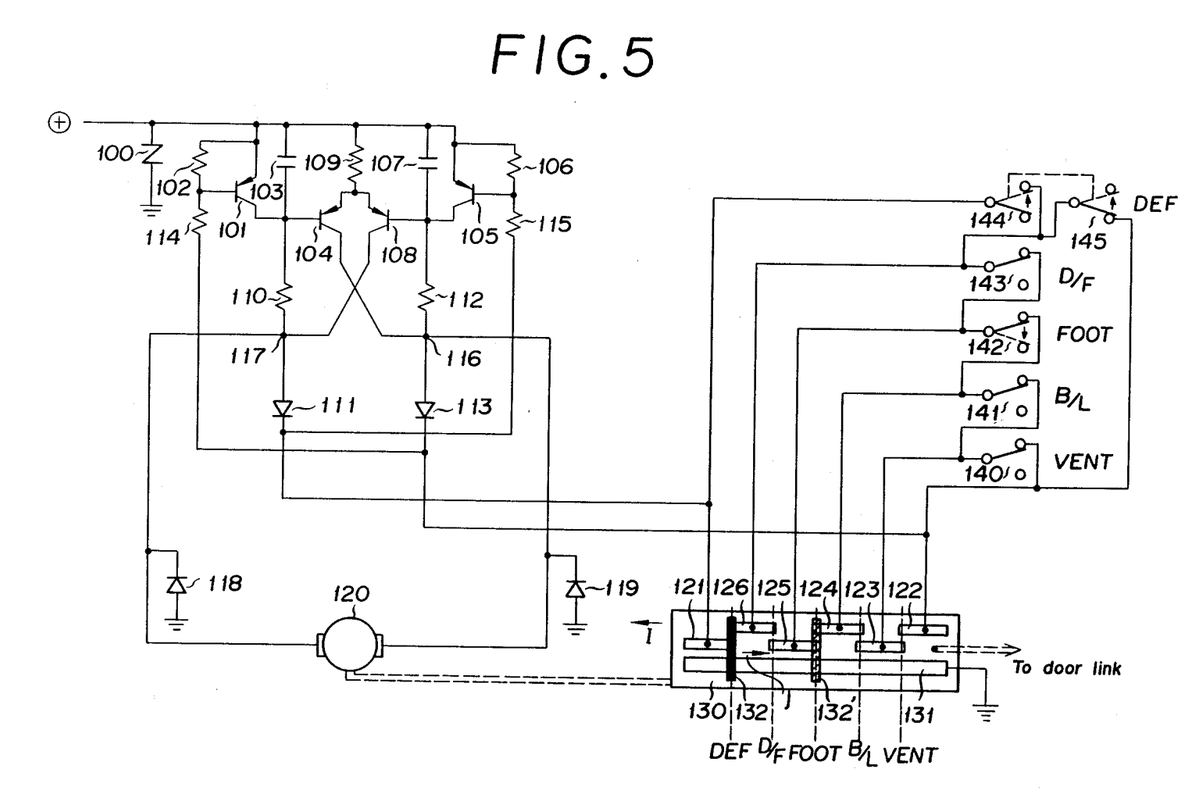
FIG. 5 is a circuit diagram showing the operation of the drive control device for the motor actuator according to the present invention, in the case that the air conditioning mode is changed from the DEF mode to a FOOT mode.

FIG. 5 shows an operating condition of the drive control device for the motor actuator in the case that the air conditioning mode is changed from the defrost mode to the foot mode.

In the defrost mode, each of the doors is set in the above-mentioned position. The defrost switch 144 is in an open position, and the other switches as well as the safety switch 145 are in a closed position. The first and second closed circuits are formed as mentioned above to maintain the defrost mode.

When the mode lever 94 is operated by the passenger to change the air conditioning mode from the DEF mode to the FOOT mode, the foot switch 142 is rotated in a direction depicted by arrow in FIG. 5 to be opened. Simultaneously, the defrost switch 144 and the safety switch 145 are rotated in a direction depicted by arrows in FIG. 5 to make the defrost switch 144 be closed and make the safety switch 145 be opened. As the defrost switch 144 is closed, the second closed circuit is formed to make the transistor 108 go off. On the other hand, as the foot switch 142 is opened, the first closed circuit is opened to lower to potential of the resistor 110 and accordingly make the transistor 104 go on. As a result, there is formed a drive circuit for the motor 120 allowing the current to flow from the positive terminal of the power source through the resistor 109, the transistor 104, the junction 116, the motor 120, the junction 117, the diode 111, the separate contact 121, the brush 132 and the main contact 131 to the ground. Accordingly, the motor 120 starts rotating in a direction counter to that in the previous case to move the moving member 130 in a direction depicted by arrow I in FIG. 5 and accordingly move the brush 132 relatively in a direction depicted by arrow J in FIG. 5. Thus, the motor 120 continues to be rotated to move the brush 132 in slide contact with the separate contacts 121, 126 and 125 in this order. In association with the movement of the moving member 130 in the direction of I, when the brush 132 is brought into contact with both the separate contacts 125 and 124 as shown by a hatched brush 132', there is formed a first closed circuit allowing the current to flow from the positive terminal of the power source through the resistor 102, the resistor 114, the vent switch 140, the bilevel switch 141, the separate contact 124, the brush 132' and the main contact 131 to the ground, and there is also formed a second closed circuit along the current to flow from the positive terminal of the power source through the resistor 106, the resistor 115, the defrost switch 144, the defrost/foot switch 143, the separate contact 125, the brush 132' and the main contact 131 to the ground. As a result, both the transistors 101 and 105 go on, and both the transistors 104 and 108 go off. Accordingly, the drive circuit for the motor 120 is opened to cause the motor 120 be deenergized and stop the moving member 130, thus setting the foot mode. In the foot mode, the defrost door 81 and the vent door 82 are rotated in such a direction as to close the defrost outlet 78 and the vent outlet 79, respectively, while the foot door 83 is rotated in such a direction as to open the foot outlet 80, thus blowing the temperature adjusted air from the foot outlet 80.

Although the air conditioning mode is changed with the movement of the moving member 130 mechanically connected to the door link (not shown) in the above-mentioned embodiment, the door link may be directly driven by the motor 120 not through the moving member 130. Further, although the switching operation of the transistor is effected by moving the moving member 130 with the brush 132 fixed in the above-mentioned embodiment, the switching operation may be effected by fixing the moving member 130 and moving the brush 132 by the motor 120 in the above case where the door link is directly driven by the motor 120 not through the moving member 130.

Moreover, although the above description of the preferred embodiment is directed to the mode actuator for selecting the air conditioning mode in the compartment, the drive control device for the motor actuator of the present invention is of course applicable to the other motor actuator such as the intake door actuator and the mix door actuator if the latter has an increased setting position. Various modifications and changes may occur to those skilled in the art without departing from the spirit and scope of the invention as defined by the appended claims.

What is claimed is:

1. A drive control device for a motor actuator in an automobile air conditioner for controlling opening and closing operations of doors to be installed in said automobile air conditioner, said drive control device comprising:
    a series of plural switches connected in series to each other, wherein when one of said switches for setting an opening degree of one of said doors is opened, all of the other switches for setting the other opening degree of the other doors are closed;
    a first sliding member provided with a plurality of separate contacts located in separation from each other, each of said separate contacts being connected to a terminal of each said switch, and provided with a main contact connected to one terminal of a power source;
    a second sliding member adapted to be moved relative to said first sliding member and into contact with said main contact and any of said separate contacts;
    a motor for driving said doors to open and close the same and moving either of said first sliding member or said second sliding member;
    a first transistor connected to one input terminal of said motor and any one of said separate contacts provided on said first sliding member, said first transistor being connected to the other terminal of said power source;
    a second transistor connected to the other input terminal of said motor and any one of said separate contacts provided on said first sliding member, said second transistor being connected to the other terminal of said power source; and
    first and second switching circuits for switching said first transistor and said second transistor, respectively, wherein said motor is controlled by said first and second switching circuits from a timing when any one of said switches is opened to a timing when said second sliding member comes into contact with both the main contact and the adjacent separate contacts contacted both the terminals of said switch opened, and when said second sliding member comes into contact with the main contact and the adjacent separate contacts, said first and second transistors are turned off by said first and second switching circuits.

2. A drive control device for a motor actuator in an automobile air conditioner for controlling opening and closing operations of doors to be installed in said automobile air conditioner, said drive control device comprising:
    a series of plural switches connected in series to each other, wherein when one of said switches for setting an opening degree of one of said doors is opened, all of the other switches for setting the other opening degree of the other doors are closed;
    an auxiliary switch connected to the switches located at both ends of said series of switches, wherein when a specific one of said switches for setting the opening degree of said one of said doors is opened, said auxiliary switch is closed cooperatively;
    a first sliding member provided with a plurality of separate contacts located in separation from each other, each of said separate contacts being connected to a terminal of each of said plural switches, and provided with a main contact connected to one terminal of a power source;
    a second sliding member adapted to be moved relative to said first sliding member and into contact with said main contact and any of said separate contacts;
    a motor for driving said doors to open and close the same and moving either of said first sliding member or said second sliding member;
    a first transistor connected to one input terminal of said motor and any one of said separate contacts provided on said first sliding member, said first transistor being connected to the other terminal of said power source;
    a second transistor connected to the other input terminal of said motor and any one of said separate contacts provided on said first sliding member, said second transistor being connected to the other terminal of said power source; and
    first and second switching circuits for switching said first transistor and said second transistor, respectively, wherein said motor is controlled by said first and second switching circuits from a timing when any one of said plural switches is opened to a timing when said second sliding member comes into contact with both the main contact and the adjacent separate contacts connected to both the terminals of said opened switch, and when said second sliding member comes into contact with the main contact and the adjacent separate contacts, said first and second transistors are turned off by said first and second switching circuits.

* * * * *

UNITED STATES PATENT AND TRADEMARK OFFICE
CERTIFICATE OF CORRECTION

PATENT NO. : 4,878,001

DATED : Oct. 31, 1989

INVENTOR(S) : Hirofumi Hagikura, Haruki Kawamoto

Page 1 of 2

It is certified that error appears in the above-identified patent and that said Letters Patent is hereby corrected as shown below:

```
Title Page, [57] ABSTRACT, line 11; "actuator, the" should
read -- actuator.  The --.
Title Page, [57] ABSTRACT, line 11; "always make" should read
-- ensure that --.
Title Page, [57] ABSTRACT, line 12; "to be set required" should
read -- is set in the required --.
Column 3, line 9; "reliability, may" should read
-- reliability may --.
Column 4, line 32; "second, transistor" should read
-- second transistor --.
Column 4, line 34; "an" should read -- any --.
Column 5, line 26; "selected" should read -- select either --.
Column 5, line 28; delete "in".
Column 6, line 15; "is" should read -- in --.
Column 6, line 19; "72 according" should read
-- 72.  According --.
Column 6, line 20; "selector lever" should read
-- selector, when lever --.
Column 6, line 59; "82 is such" should read -- 82 in such --.
Column 6, line 60,61; delete "thus blowing the air adjusted in
temperature from the vent outlet 79," first occurrence.
Column 7, line 2; "blowing a electively" should read
-- blowing selectively --.
Column 7, line 6; "feet is" should read -- feet are --.
Column 7, line 28; "form" should read -- from --.
Column 7, line 56/57; "to a base of as transistor" should read
-- to the base of transistor --.
Column 8, line 16; "rotate, should read -- rotated, --.
Column 9, line 61; "Under the" should read -- Under this --.
Column 10, line 51; delete "eh".
```

UNITED STATES PATENT AND TRADEMARK OFFICE
CERTIFICATE OF CORRECTION

PATENT NO. : 4,878,001

DATED : Oct. 31, 1989

INVENTOR(S) : Hirofumi Hagikura, Haruki Kawamoto

It is certified that error appears in the above-identified patent and that said Letters Patent is hereby corrected as shown below:

```
Column 10, line 51; "is" should read --are --.
Column 11, line 35; "As result" should read -- As a result --.
Column 11, line 49; "would generated" should read
-- would be generated --.
Column 11, line 55; "is to obtained." should read
-- is not obtained. --.
Column 11, line 56; "is over away" should read -- is away --.
Column 12, line 10; "142"       should read -- 142, --.
Column 12, line 12; "may be" should read -- may still be --.
Column 13, line 3;  "be" should read -- to be --.
Column 14, line 11; "switch opened" should read
-- opened switch --.
```

Signed and Sealed this

Eighteenth Day of June, 1991

*Attest:*

HARRY F. MANBECK, JR.

*Attesting Officer*      *Commissioner of Patents and Trademarks*